(12) United States Patent
Jiang (10) Patent No.: US 12,494,060 B1
(45) Date of Patent: Dec. 9, 2025

(54) EVENT DETECTION SYSTEM AND EVENT DETECTION METHOD OF AREA

(71) Applicant: IsCoolLab Co., Ltd., Taipei (TW)

(72) Inventor: Yan-Mei Jiang, Taipei (TW)

(73) Assignee: IsCoolLab Co., Ltd., Taipei (TW)

( * ) Notice: Subject to any disclaimer, the term of this patent is extended or adjusted under 35 U.S.C. 154(b) by 0 days.

(21) Appl. No.: 18/924,977

(22) Filed: Oct. 23, 2024

(30) Foreign Application Priority Data

Jun. 7, 2024 (TW) .................................. 113121139

(51) Int. Cl.
| | |
|---|---|
| *H04N 7/00* | (2011.01) |
| *G06Q 10/0631* | (2023.01) |
| *G06Q 10/0633* | (2023.01) |
| *G06Q 10/10* | (2023.01) |
| *G06T 7/11* | (2017.01) |
| *G06V 20/40* | (2022.01) |

(52) U.S. Cl.
CPC ..... *G06V 20/44* (2022.01); *G06Q 10/063114* (2013.01); *G06Q 10/063116* (2013.01); *G06Q 10/0633* (2013.01); *G06Q 10/103* (2013.01); *G06T 7/11* (2017.01)

(58) Field of Classification Search
USPC ....................................................... 348/143
See application file for complete search history.

(56) References Cited

U.S. PATENT DOCUMENTS

| | | | | |
|---|---|---|---|---|
| 2018/0286079 | A1* | 10/2018 | Ben Moshe | .............. G06T 7/85 |
| 2018/0293959 | A1* | 10/2018 | Monga | .................. G06F 3/1446 |
| 2018/0295475 | A1* | 10/2018 | Cao | .......................... H04W 4/90 |

FOREIGN PATENT DOCUMENTS

| | | |
|---|---|---|
| CN | 111624967 A | 9/2020 |
| CN | 112567400 A | 3/2021 |

\* cited by examiner

*Primary Examiner* — Nigar Chowdhury
(74) *Attorney, Agent, or Firm* — Li & Cai Intellectual Property Office (57) ABSTRACT

An event detection system and an event detection method of an area are provided. The event detection system is applicable to a first area that includes sub-areas each including an indication device and an apparatus. Each of the indication devices includes indication signal display modules. The event detection system includes a first image capturing device and a control circuit. The control circuit divides first area image information of the first area into first sub-area image information. The control circuit captures an indication signal of the indication device and human image information from each of the first sub-area image information of the first area. The control circuit selects workflows according to the indication signal and an action content corresponding to the human image information, and executes workflows that correspond to the apparatus corresponding to each of the sub-areas of the first area by using operation processes.

12 Claims, 6 Drawing Sheets

EVENT DETECTION SYSTEM AND EVENT DETECTION METHOD OF AREA

CROSS-REFERENCE TO RELATED PATENT APPLICATION

This application claims the benefit of priority to Taiwan Patent Application No. 113121139, filed on Jun. 7, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an event detection system and an event detection method, and more particularly to an event detection system and an event detection method for an area that can reduce costs.

BACKGROUND OF THE DISCLOSURE

The costs for implementing an existing event detection system and an event detection method are high. Specifically, a detection system of a production line is mostly customized according to customer requirements, especially in relation to workflow connection (e.g., robotic process automation (RPA)) of different divisions (e.g., a procurement system, a production system, and a maintenance division). In addition, since different manufacturers have different divisions and related requirements, the cost of the detection system is unable to be reduced.

SUMMARY OF THE DISCLOSURE

In order to solve the above-mentioned problems, one of the technical aspects adopted by the present disclosure is to provide an event detection system of an area. The event detection system is applicable to a first area. The first area includes a plurality of sub-areas, and each of the sub-areas includes an indication device and an apparatus, and each of the indication devices is disposed on one side of the corresponding apparatus or on the apparatus. The event detection system includes a first image capturing device and a control circuit. The first image capturing device captures a plurality of first area image information of the first area. The control circuit is electrically connected to the first image capturing device. The control circuit divides each of the first area image information of the first area into a plurality of first sub-area image information. The control circuit captures an indication signal of the indication device and human image information from each of the first sub-area image information of the first area. The control circuit selects a plurality of workflows according to the indication signal and an action content corresponding to the human image information, and the control circuit utilizes at least one software operation process, at least one mouse operation process, at least one keyboard operation process, or at least one electronic device operation process to execute the plurality of workflows that corresponds to the apparatus corresponding to each of the plurality of sub-areas of the first area.

In order to solve the above-mentioned problems, another one of the technical aspects adopted by the present disclosure is to provide an event detection method of an area. The event detection method includes steps as follows: capturing a plurality of first area image information of a first area; dividing the plurality of first area image information into a plurality of sub-area image information; capturing one or more indication signals of an indication device corresponding to each of the sub-area image information and a plurality of human image information of a user entering a sub-area corresponding to each of the sub-area image information; according to the respective indication signals of the corresponding indication device in each of the sub-area image information and a corresponding action content of the plurality of human image information, selecting one or more workflows corresponding to the indication signals and the human image information, and utilizing at least one software operation process, at least one mouse operation process, at least one keyboard operation process, or at least one electronic device operation process to operate the one or more workflows corresponding to the indication signal through simulating an operation manner of the user on the electronic device.

One of the beneficial effects of the present disclosure is that, the event detection system and event detection method of the area as provided by the present disclosure can use an image capturing device to effectively and quickly inspect various workflows and human image information of an area that needs to be inspected. The event detection system and the event detection method of the present disclosure greatly reduce the installation cost; furthermore, not only can the system and the method be quickly established, but the required workflows can also be adjusted according to customer requirements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 1:
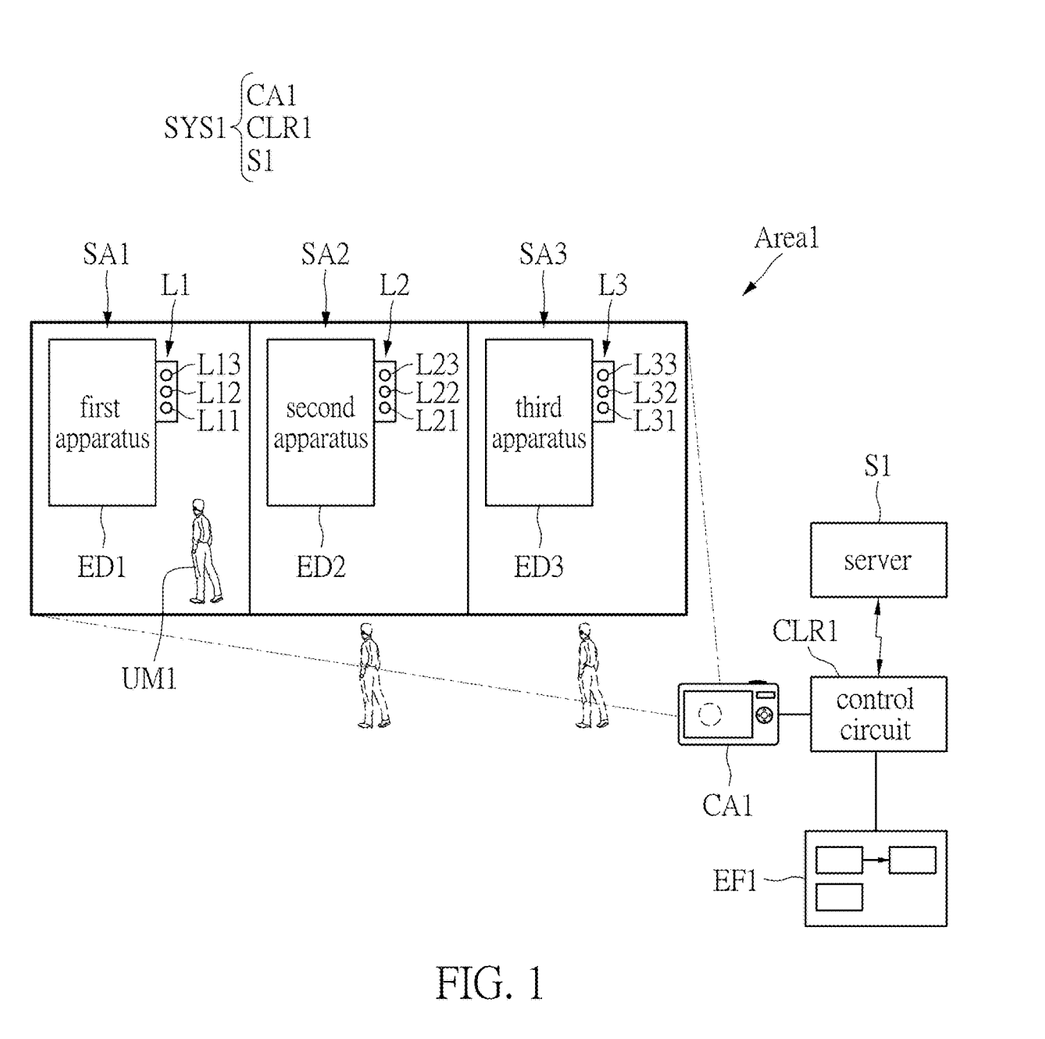
FIG. 1 is a schematic diagram of an event detection system of an area according to a first embodiment of the present disclosure.
Figure 2:
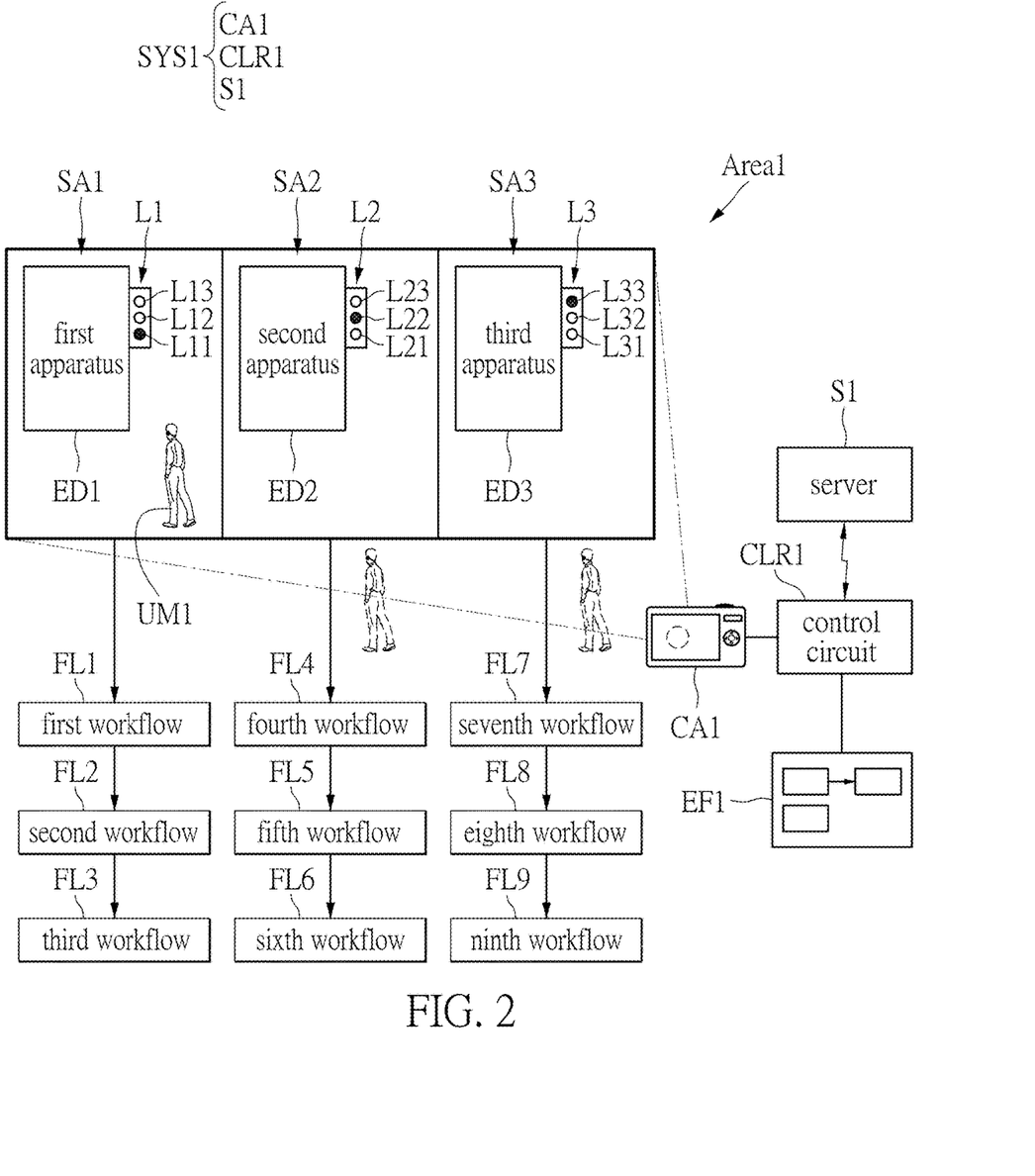
FIG. 2 is another schematic diagram of the event detection system according to the first embodiment of the present disclosure.
Figure 3:
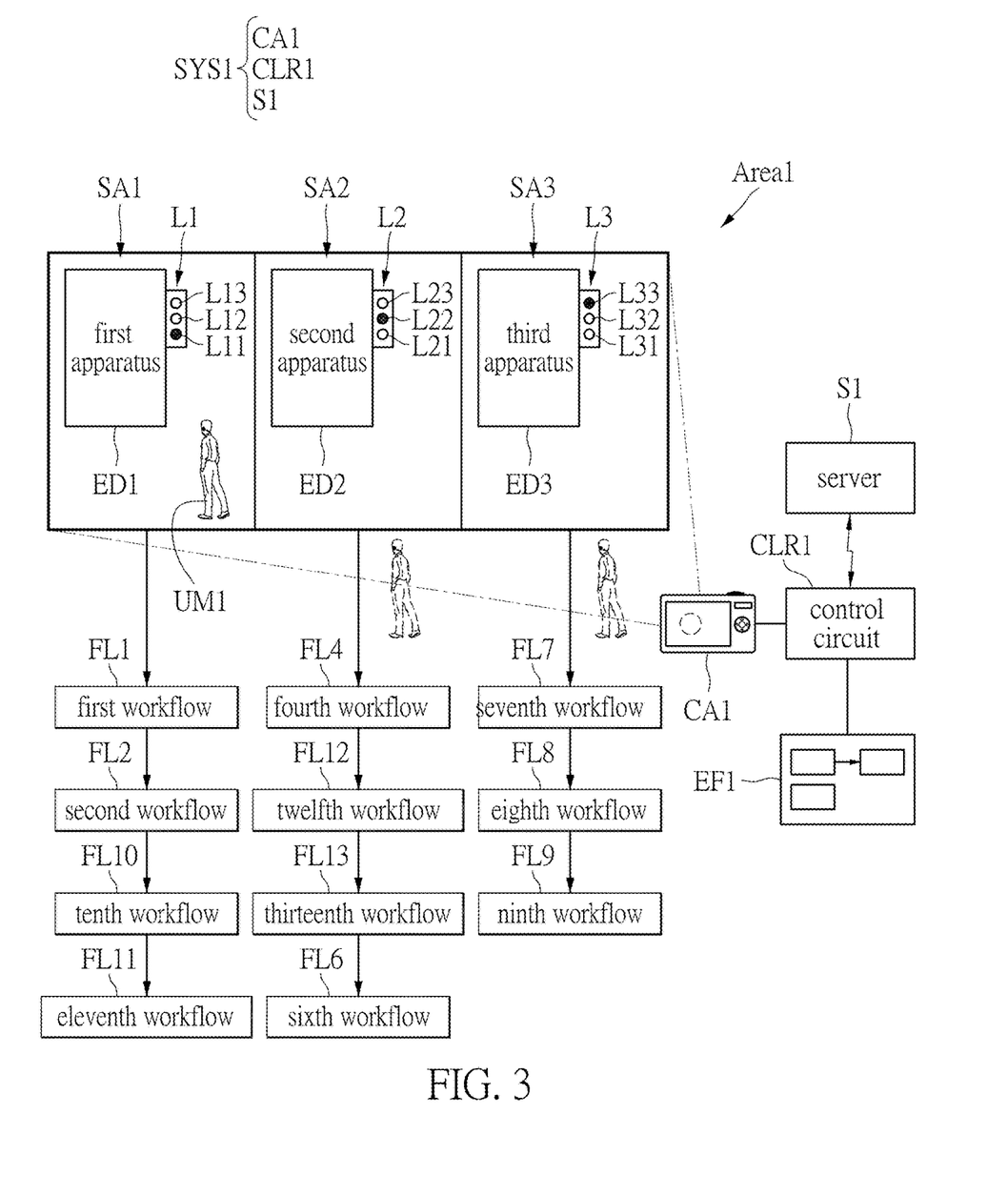
FIG. 3 is yet another schematic diagram of the event detection system according to the first embodiment of the present disclosure.

Referring to FIG. 1, FIG. 2, and FIG. 3, FIG. 1 is a schematic diagram of an event detection system of an area according to a first embodiment of the present disclosure, FIG. 2 is another schematic diagram of the event detection system according to the first embodiment of the present disclosure, and FIG. 3 is yet another schematic diagram of the event detection system according to the first embodiment of the present disclosure.

In this embodiment, an event detection system SYS1 is applicable to a first area Area1.

The first area Area1 includes a plurality of sub-areas SA1 to SA3 (i.e., a first sub-area SA1, a second sub-area SA2, and a third sub-area SA3).

Each of the sub-areas SA1 to SA3 respectively includes indication devices L1 to L3 and apparatuses ED1 to ED3 (i.e., a first apparatus ED1, a second apparatus ED2, and a third apparatus ED3). Each of the indication devices L1 to L3 is provided on one side of the corresponding apparatuses ED1 to ED3. Each of the indication devices L1 to L3 correspondingly includes a plurality of indication signal display modules L11 to L33 (i.e., first indication signal display modules L11, L21, and L31, second indication signal display modules L12, L22, and L32, and third indication signal display modules L13, L23, and L33).

The event detection system SYS1 includes a first image capturing device CA1 and a control circuit CLR1. The first image capturing device CA1 is used to capture a plurality of first area image information of the first area Area1. The control circuit CLR1 is electrically connected to the first image capturing device CA1. The control circuit CLR1 divides each of the first area image information of the first area Area1 into a plurality of sub-area image information.

The control circuit CLR1 captures an indication signal of each of the indication signal display modules L11 to L33 of the indication devices L1 to L3 and human image information from each of the sub-area image information of the first area Area1. When the first image capturing device CA1 detects that a user enters the first area Area1, the first image capturing device CA1 captures the human image information corresponding to the user.

The control circuit CLR1 determines a plurality of workflows for the plurality of apparatuses ED1 to ED3 corresponding to each of the sub-areas SA1 to SA3 of the first area Area1 based on the indication signal of each of the indication signal display modules L11 to L33 and an action content corresponding to the human image information.

Accordingly, the event detection system SYS1 further includes a server S1. The control circuit CLR1 transmits a record content of a plurality of workflows FL1 to FL13 (i.e., a first workflow FL1 to a thirteenth workflow FL13) of the apparatuses ED1 to ED3 corresponding to each of the sub-areas SA1 to SA3 to the server S1. A workflow number of plurality of workflows FL1 to FL 13 is adjustable.

The workflow contents of each of the plurality of workflows FL1 to FL13 are also adjustable. That is to say, the plurality of workflows corresponding to the indication signals of each of the indication signal display modules L11 to L33 of the indication devices L1 to L3 are also adjustable. The first image capturing device CA1 is a camera.

The control circuit CLR1 is connected to an editing interface EF1. A sequence of the plurality of workflows FL1 to FL13 and a workflow content of each of the workflows FL1 to FL13 can be edited and adjusted through the editing interface EF1.

Each of the indication devices L1 to L3 is a three-color lamp. Each of the plurality of indication signal display modules L11 to L13 of the indication devices L1 to L3 includes different colors. The human image information is image information of one or more users entering the plurality of sub-areas SA1 to SA3 of the first area Area1. The control circuit CLR1 determines an operation status of the corresponding apparatuses ED1 to ED3 based on the action content of the human image information and the indication signal of one of the plurality of indication signal display modules L11 to L33. An operation process of robotic process automation refers to connection made between each of the workflows FL1 to FL13, the indication signal of each of the indication signal display modules L11 to L33, and the human image information.

The action content of the human image information can include an entry action, a checking action, a repairing action, a leaving action, or a moving action. The entry action refers to the image content in which the user enters one of the plurality of sub-areas SA1 to SA3. The checking action refers to the action of the user checking the corresponding apparatuses ED1 to ED3 after the user enters one of the plurality of sub-areas SA1 to SA3. The repairing action refers to that, after the user enters one of the plurality of sub-areas SA1 to SA3, the user performs actions such as repairing and disassembling parts on the corresponding apparatuses ED1 to ED3. The leaving action refers to the action of the user leaving the first area Area1 that the user has entered previously. The moving action refers to the action of the user moving between the plurality of sub-areas SA1 to SA3.

The first image capturing device CA1 captures the plurality of first area image information of the first area Area1.

The plurality of apparatuses ED1 to ED3 and the indication devices L1 to L3 are provided in the first area Area1. In this embodiment, the area image information captured by the first image capturing device CA1 needs to cover the plurality of indication devices L1 to L3. A preferred case is that, the area image information can cover all apparatuses ED1 to ED3 and the plurality of indication devices L1 to L3.

Reference is made to FIG. 2. The control circuit CLR1 is electrically connected to the first image capturing device CA1. The control circuit CLR1 analyzes a plurality of first area image information of the first area Area1 to capture an indication signal of each of the indication signal display modules L11 to L33 of the indication devices L1 to L3 of each of the sub-areas SA1 to SA2. The control circuit CLR1 determines the plurality of workflows FL1 to FL9 of the first apparatus ED1 corresponding to each of the sub-areas SA1 to SA3 according to the indication signal of each of the indication signal display modules L11 to L33.

The event detection system SYS1 further includes the server S1. The control circuit CLR1 transmits a record content of the plurality of workflows FL1 to FL9 of the apparatuses ED1 to ED3 corresponding to each of the sub-areas SA1 to SA3 to the server S1.

Since the image capturing device CA1 is a camera and each of the indication devices L1 to L3 is a three-color lamp, the plurality of indication signal display modules L11 to L33 of the indication devices L1 to L3 respectively include different colors which are red, yellow, and green.

Reference is made to FIG. 2. When the control circuit CLR1 detects that the indication signal display modules L11 to L33 of the apparatuses ED1 to ED3 in the sub-area SA1 to SA3 light up, the control circuit CLR1 provides the workflows FL1 to FL9 according to the indication signal of the indication signal display modules L11 to L33.

Furthermore, in the first area Area1, various users will enter each of the sub-areas SA1 to SA3 and perform various actions on the apparatuses ED1 to ED3. Therefore, the control circuit CLR1 detects the human image information in the area image information captured by the first image capturing device CA1. The human image information may include upper body image information of a user or whole body image information of a user.

The control circuit CLR1 performs motion analysis based on the human image information that is detected, and determines that the human image information is the various above-mentioned action contents.

In addition to detecting the action content corresponding to the human image information, the control circuit CLR1 further records the start time, duration, and end time of each of the actions to correspond with the indication signals of the respective indication devices L1 to L3 of the apparatuses ED1 to ED3, so as to determine the operation status of the apparatuses ED1 to ED3.

Furthermore, in this embodiment, the first workflow FL1 to the ninth workflow FL9 can be customized. In an area of a first manufacturer, the first workflow FL1 to the ninth workflow FL9 may be workflows that use the server S1 to call maintenance personnel or record a utilization rate. In an area of a second manufacturer, the workflows FL1 to FL9 can be another set of workflows. In addition, when each of the indication signals is detected, the corresponding workflow number can be adjusted according to practical requirements.

In this embodiment, each of the indication signal display modules L11 to L33 of the indication devices L1 to L3 has the same configuration. In other embodiments, the respective indication signal display modules L11 to L33 of the indication devices L1 to L3 may be configured differently. That is, the indication signal display modules may include different light signals. The control circuit CLR1 can also detect the indication signals of the indication devices L1 to L3 having different settings, and the present disclosure is not limited thereto. In other embodiments, in addition to the three-color lamps, the indication devices L1 to L3 may also be a pointer indicator, a pointer pressure gauge, or a digital display indicator. That is, the control circuit CLR1 can not only detect color, but can also detect pointer changes, digital changes, or movement changes. That is, the indication devices L1 to L3 can provide a light indication signal, a pointer indication signal, a digital mark indication signal, or a motion content indication signal.

Referring to FIG. 3, FIG. 3 is yet another schematic diagram of the event detection system according to the first embodiment of the present disclosure.

Accordingly, the control circuit CLR1 can adjust correlations or contents of the plurality of apparatuses ED1 to ED3, the plurality of indication devices L1 to L3, the plurality of indication signal display modules L11 to L33, and the plurality of workflows FL1 to FL9 according to an editing requirement signal provided by the user through the editing interface EF1. Furthermore, the editing requirement signal may be provided by the editing interface EF1 included in the event detection system SYS1. The user can use the editing interface EF1 to edit relationship links of the apparatuses ED1 to ED3 in each of the sub-areas SA1 to SA3, relationship links between the apparatuses ED1 to ED3 and the indication devices L1 to L3, and relationship links between the indication signal display modules L11 to L33 of the indication devices L1 to L3 and each of the workflows. For example, in addition to detecting the indication signals of the indication devices L1 to L3, according to whether or not the apparatuses ED1 to ED3 are operating normally, the control circuit CLR1 can compare the operation status of the apparatuses ED1 to ED3 with the indication signals of the indication devices L1 to L3, so as to determine whether the apparatuses ED1 to ED3 are not operating normally or the indication devices L1 to L3 do not send out the indication signal correctly.

Referring to FIG. 2 and FIG. 3, the workflows corresponding to the first indication signal display module L11 in FIG. 2 are the first workflow FL1, the second workflow FL2, and the third workflow FL3. In FIG. 3, the workflows corresponding to the first indication signal display module L11 can be edited into the first workflow FL1, the second workflow FL2, the tenth workflow FL10, and the eleventh workflow FL11. The workflows corresponding to the second indication signal display module L22 in FIG. 2 are the fourth workflow FL4, the fifth workflow FL5, and the sixth workflow FL6. In FIG. 3, the workflows corresponding to the second indication signal display module L22 can be edited into the fourth workflow FL4, the twelfth workflow FL12, the thirteenth workflow FL13, and the sixth workflow FL6. In addition, the content of each of the workflows FL1 to FL13 can be adjusted and set according to user requirements. The plurality of workflows FL1 to FL13 of the plurality of apparatuses ED1 to ED3 provided by the control circuit CLR1 are directly related to the indication signals provided by the indication devices L1 to L3 corresponding to the apparatuses ED1 to ED3.

The control circuit CLR1 can be implemented using hardware in this embodiment. In other embodiments, the control circuit CLR1 can be implemented using hardware (such as a programmable chip or a CPU) in coordination with software, which is not limited in the present disclosure.

In addition, the editing interface EF1 can be displayed on a display device, a desktop computer, a smartphone, or a tablet to allow the user to edit.

Referring to FIG. 3, the workflows FL1 to FL13 can be edited through the editing interface EF1 connected to the control circuit CLR. In this embodiment, the workflows can be divided into indication signal workflows and personnel workflows. The indication signal workflows are the workflows corresponding to the detection of different indication signals from the indication devices L1 to L3. For example, the working status duration of the apparatuses ED1 to ED3, the downtime of the apparatuses ED1 to ED3, the recovery time of the apparatuses ED1 to ED3, or whether or not there are personnel to perform checking, repairing, or adjustment when the apparatuses ED1 to ED3 fail. The personnel workflows include sending notification messages to notify the responsible personnel currently in the factory and the supervisor of the responsible department. The operation process of robotic process automation refers to connection made between each of the workflows FL1 to FL13, the indication signal of each of the indication signal display modules L11 to L33, and the human image information.

Figure 4:
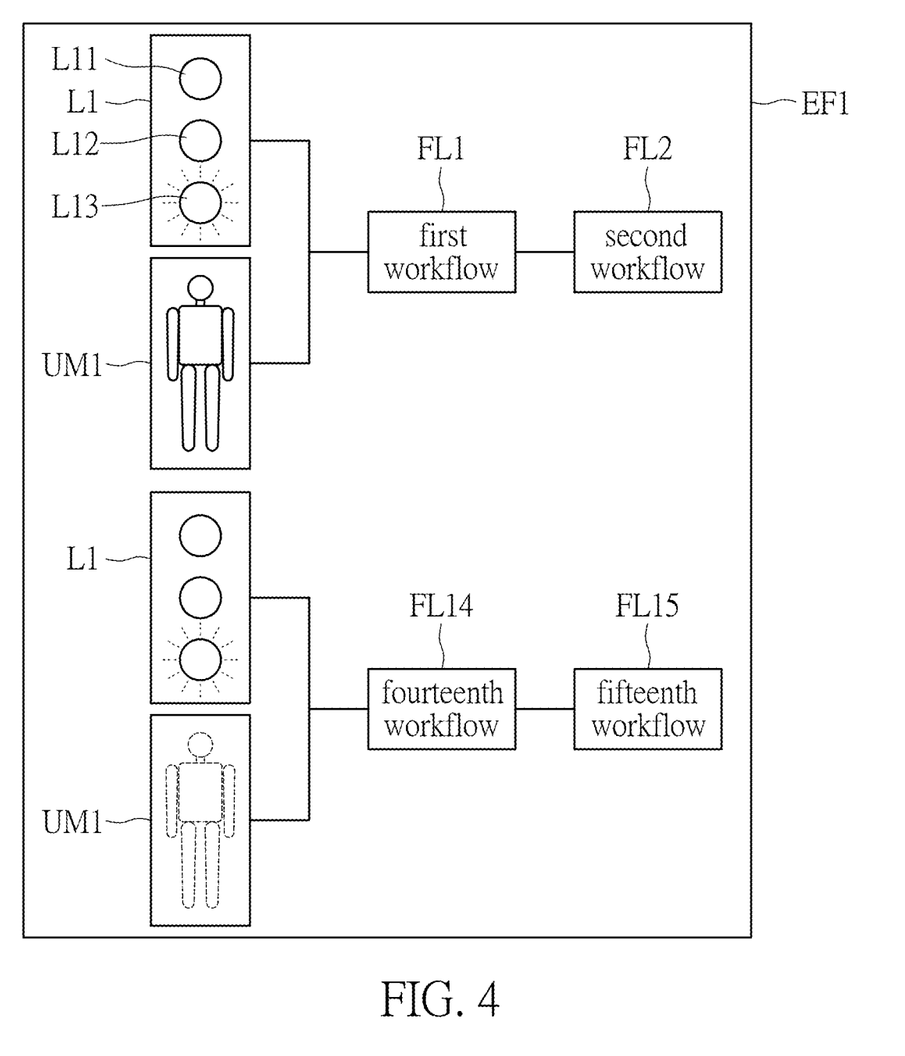
FIG. 4 is a schematic diagram of an editing interface according to the first embodiment of the present disclosure.

Furthermore, referring to FIG. 4, FIG. 4 is a schematic diagram of an editing interface according to the first embodiment of the present disclosure. When editing through the editing interface EF1, the editing interface EF1 can be linked to the corresponding plurality of workflows FL1 to FL13 according to indication image information of the indication signal, a color of the indication signal, a shape of the indication signal, or different postures of the human image information.

In FIG. 4, when the third indication signal display module L13 of the first indication device L1 lights up, the first workflow FL1 and the second workflow FL2 are connected together with human image information UM1 of the user. In addition, when the third indication signal display module L13 of the first indication device L1 lights up, if no human image information is detected (the human image information UM1 in FIG. 4 is shown using broken line, indicating that no person is present), the first indication device L1 is connected to a fourteenth workflow FL 14 and a fifteenth workflow FL15.

The control circuit CLR1 can select the plurality of workflows FL1 to FL15 from a database (not shown in the figures). Since a connection relationship of each of the workflows FL1 to FL15 has been determined through the editing interface EF1 in this embodiment, the control circuit CLR1 can directly execute the workflow corresponding to each of the indication signals or the human image information. In addition, each of the workflows FL1 to FL15 is executed by the control circuit CLR1 using at least one software operation process, at least one mouse operation process, at least one keyboard operation process, and at least one electronic device operation process. That is, each of the workflows FL1 to FL15 is executed on an electronic device (not shown in the figures) (in this embodiment, a desktop computer), and this electronic device (not shown in the figures) can be connected to the image capturing device CA1. The image of the image capturing device CA1 will be displayed on a display device (not shown in the figures) connected to the electronic device (not shown in the figures). In this embodiment, the electronic device (not shown in the figures) may be the control circuit CLR1 or be disposed in the control circuit CLR1. Then, each of the workflows FL1 to FL15 will be executed by simulating an operation process operated by a user on an electronic device (not shown in the figures). That is, the event detection system SYS1 in this embodiment uses computer vision to simulate the user viewing the image of the image capturing device CA1. When the event detection system SYS1 uses computer vision to view different indication signals, the event detection system SYS1 uses the control circuit CLR1 to operate the workflow corresponding to the electronic device (not shown in the figures). Each of the workflows FL1 to FL15 is composed of one or more operation processes of at least one software operation process, at least one mouse operation process, at least one keyboard operation process, and at least one electronic device process.

Second Embodiment

Figure 5:
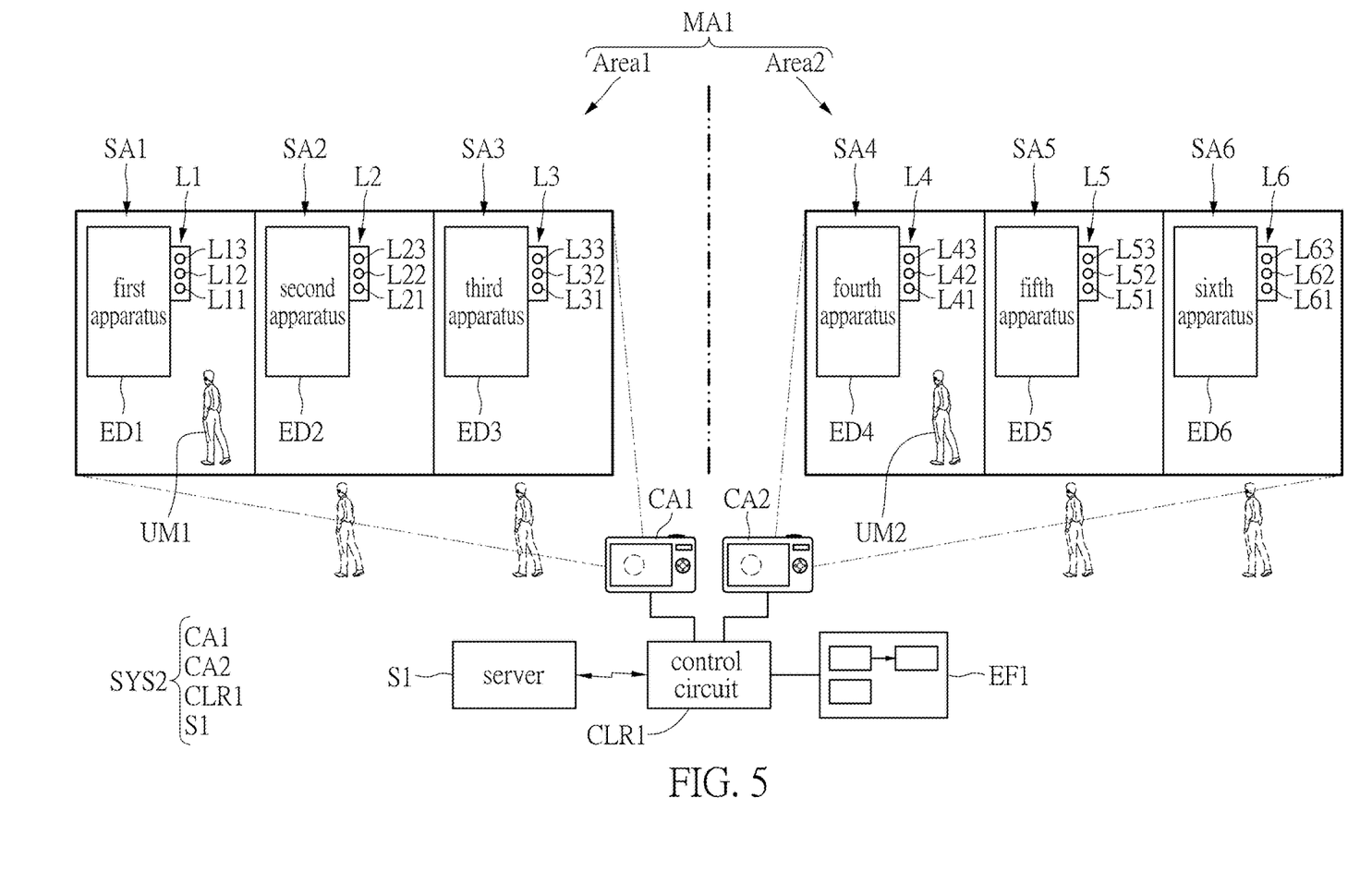
FIG. 5 is a schematic diagram of the event detection system according to a second embodiment of the present disclosure.

Referring to FIG. 5, FIG. 5 is a schematic diagram of an event detection system of an area according to a second embodiment of the present disclosure.

An event detection system SYS2 can be used to inspect the apparatus and personnel scheduling of the first area Area1 and a second area Area2.

The event detection system SYS2 includes a control circuit CLR1, a first image capturing device CA1, a second image capturing device CA2, and a server S1. The control circuit CLR1 is connected to an editing interface EF1.

The first image capturing device CA1 captures a plurality of first area image information in the first area Area1 and a plurality of human image information UM1 of users entering the first area Area1. The second image capturing device CA2 captures a plurality of second area image information in the second area Area2 and a plurality of human image information UM2 of the users entering the second area Area2.

Similarly, the first area Area1 includes a plurality of sub-areas SA1 to SA3, which are the first sub-area SA1, the second sub-area SA2, and the third sub-area SA3, respectively. The second area Area2 includes a plurality of sub-areas SA4 to SA6 (i.e., a fourth sub-area SA4, a fifth sub-area SA5, and a sixth-sub area SA6), which are the fourth sub-area SA4, the fifth sub-area SA5, and the sixth sub-area SA6, respectively. Apparatuses ED1 to ED3 are correspondingly disposed on the sub-areas SA1 to SA3 of the first area Area1, and apparatuses ED4 to ED6 (i.e., a fourth apparatus ED4, a fifth apparatus ED5, and a sixth apparatus ED6) are correspondingly disposed on the sub-areas SA4 to SA6 of the second area Area2.

The control circuit CLR1 can use the indication signals in the plurality of first area image information of the first area Area1 and the action content corresponding to the human image information to determine the operation status of the plurality of apparatuses ED1 to ED3 in the first area Area1. Similarly, the control circuit CLR1 can use the indication signals in the plurality of second area image information of the second area Area2 and the action content corresponding to the human image information to determine the operation status of the plurality of apparatuses ED4 to ED6 in the second area Area2.

In addition, the first area Area1 and the second area Area2 have a predetermined distance therebetween. The control circuit CLR1 can obtain a personnel attendance list for a current day or a current time duration beforehand. The control circuit CLR1 can select a first user in the personnel attendance list and send a notification message to the first user to notify the first user that an abnormal operation has occurred in the apparatuses ED1 to ED3 in the first area Area1. Then, the control circuit CLR1 selects a second user in the personnel attendance list and send a notification message to the second user to notify the second user that an abnormal operation has occurred in the apparatuses ED4 to ED6 in the second area Area2.

Alternatively, in the case that the first user is the only person on the personnel attendance list of the current day available for notification, the control circuit CLR1 notifies the first user that the apparatuses ED1 to ED6 in the first area Area1 and the second area Area2 need to be checked. Accordingly, based on the number of the maintenance personnel, the control circuit CLR1 records and analyzes the workflows and the content of the human image information of the user corresponding to each of the apparatuses. In this embodiment, the first area Area1 and the second area Area2 may be parts of map information MA1. The map information MA1 includes at least the first area Area1 and the second area Area2. The map information MA1 may include a plurality of areas similar to the first area Area1 and the second area Area2 having image capturing devices, as a reference for allocating apparatuses or human resources.

Third Embodiment

Figure 6:
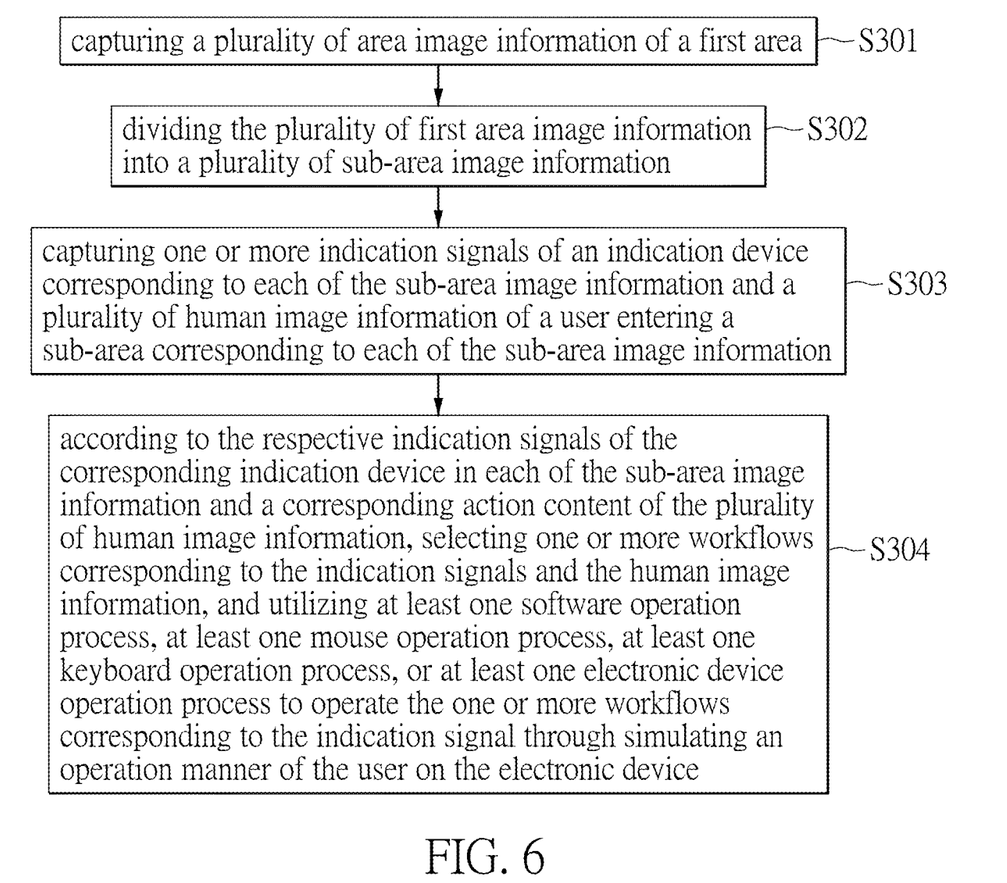
FIG. 6 is a workflow chart of an event detection method of an area according to a third embodiment of the present disclosure.

Referring to FIG. 6, FIG. 6 is a workflow chart of an event detection method of an area according to a third embodiment of the present disclosure.

In this embodiment, an event detection method of an area is provided. The event detection method of this embodiment is applicable to the event detection system SYS1 and the event detection system SYS2 of the previous embodiments. Functions and structures of the event detection system SYS1 and the event detection system SYS2 will not be described in detail in this embodiment.

The event detection method in this embodiment includes the following steps.

Step S301 includes: capturing a plurality of area image information of a first area.

Step S302 includes: dividing the plurality of first area image information into a plurality of sub-area image information.

Step S303 includes: capturing one or more indication signals of an indication device corresponding to each of the sub-area image information and a plurality of human image information of a user entering a sub-area corresponding to each of the sub-area image information.

Step S304 includes: according to the respective indication signals of the corresponding indication device in each of the sub-area image information and a corresponding action content of the plurality of human image information, selecting one or more workflows corresponding to the indication signals and the human image information, and utilizing at least one software operation process, at least one mouse operation process, at least one keyboard operation process, or at least one electronic device operation process to operate the one or more workflows corresponding to the indication signal through simulating an operation manner of the user on the electronic device. In this embodiment, the operation process of robotic process automation refers to connection made between each of the workflows, the indication signal of each of the indication signal display modules, and the human image information.

In this embodiment, step S301 to step S304 can be applied to the event detection system SYS1 and the event detection system SYS2 of the previous embodiments. The control circuit CLR1 is utilized to detect the indication signals of the indication devices L1 to L3 and the human image information of the users entering each of the sub-areas SA1 to SA3, and the indication signals of the respective indication devices L1 to L3 of the apparatuses ED1 to ED3 are used to determine whether or not action contents corresponding to the human image information are present.

Beneficial Effects of the Embodiments

In conclusion, one of the beneficial effects of the present disclosure is that the event detection system and event detection method of the area as provided by the present disclosure can use an image capturing device to effectively and quickly inspect various workflows and human image information of an area that needs to be inspected. The event detection system and the event detection method of the present disclosure greatly reduce the installation cost; furthermore, the system and the method not only can be quickly established, but also the required workflows can be adjusted according to customer requirements.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An event detection system of an area, applicable to a first area, the event detection system comprising:
    a first image capturing device capturing a plurality of first area image information of the first area; wherein the first area includes a plurality of sub-areas, and each of the sub-areas includes an indication device and an apparatus, and each of the indication devices is disposed on one side of the corresponding apparatus or on the apparatus; and
    a control circuit electrically connected to the first image capturing device, wherein the control circuit divides each of the first area image information of the first area into a plurality of first sub-area image information;
    wherein the control circuit captures an indication signal of the indication device and human image information from each of the first sub-area image information of the first area;
    wherein the control circuit selects a plurality of workflows according to the indication signal and an action content corresponding to the human image information, and the control circuit utilizes at least one software operation process, at least one mouse operation process, at least one keyboard operation process, or at least one electronic device operation process to execute the plurality of workflows that corresponds to the apparatus corresponding to each of the plurality of sub-areas of the first area.

2. The event detection system according to claim 1, further comprising a server, wherein the control circuit transmits a record content of the plurality of workflows of the apparatus corresponding to each of the sub-areas to the server; wherein the indication device provides a light indication signal, a pointer indication signal, a digital mark indication signal, or a motion content indication signal; wherein the at least one software operation process, the at least one mouse operation process, the at least one keyboard operation process, or the at least one electronic device process of the control circuit simulates operation processes operated by a user on an electronic device.

3. The event detection system according to claim 2, wherein a workflow number of the plurality of workflows associated with each of the indication signals is adjustable, a workflow content of each of the plurality of workflows associated with each of the indication signals is adjustable, and a sequence and corresponding determination criteria of the plurality of workflows corresponding to the indication signals of one of a plurality of indication signal display modules of the indication device are adjustable; wherein the image capturing device is a camera.

4. The event detection system according to claim 3, wherein the control circuit is connected to an editing interface, and the workflow number of the plurality of workflows, the workflow content of each of the plurality of workflows, and the sequence of the plurality of workflows of each of the indication signals are edited and adjusted through the editing interface; wherein, when editing through the editing interface, the editing interface is linked to the corresponding plurality of workflows according to indication image information of the indication signal, a color of the indication signal, or a shape of the indication signal.

5. The event detection system according to claim 4, wherein each of the indication devices is a three-color lamp, a pointer indicator, a pointer pressure gauge, or a digital display indicator; wherein, when the indication device is the three-color lamp, the indication device includes the plurality of indication signal display modules; wherein each of the plurality of indication signal display modules includes different colors, respectively, and the human image information is image information when one or more of the users enter the plurality of sub-areas of the first area, the control circuit determines an operation status of the apparatus according to the action content of the human image information and the indication signals of one of the plurality of indication signal display modules; wherein the plurality of workflows are determined by recording the plurality of operation processes of the user on the electronic device, and simulating the plurality of operation processes of the user on the electronic device.

6. The event detection system according to claim 5, wherein the event detection system is further applicable to a second area, the event detection system further comprises a second image capturing device, and the second image capturing device captures a plurality of second area image information of the second area, wherein the control circuit is electrically connected to the second image capturing device, and the control circuit divides each of the second area image information of the second area into a plurality of sub-area image information;

wherein the control circuit captures an indication signal of the indication device and human image information from each of the sub-area image information of the second area;

wherein the control circuit selects one or more workflows corresponding to the indication signals and the human image information according to the action content corresponding to each of the indication signals and the human image information, and utilizes the at least one software operation process, the at least one mouse operation process, the at least one keyboard operation process, or the at least one electronic device operation process to operate the one or more workflows corresponding to the indication signals through simulating an operation manner of the user on the electronic device.

7. The event detection system according to claim 6, wherein the control circuit is configured to determine a personnel scheduling status and an apparatus operation status of the first area and the second area according to the plurality of workflows of the apparatus corresponding to each of the sub-areas of the first area and the plurality of workflows of the apparatus corresponding to each of sub-areas of the second area.

8. An event detection method of an area, comprising:
capturing a plurality of first area image information of a first area;
dividing the plurality of first area image information into a plurality of sub-area image information;
capturing one or more indication signals of an indication device corresponding to each of the sub-area image information and a plurality of human image information of a user entering a sub-area corresponding to each of the sub-area image information;
according to the respective indication signals of the corresponding indication device in each of the sub-area image information and a corresponding action content of the plurality of human image information, selecting one or more workflows corresponding to the indication signals and the human image information, and utilizing at least one software operation process, at least one mouse operation process, at least one keyboard operation process, or at least one electronic device operation process to operate the one or more workflows corresponding to the indication signal through simulating an operation manner of the user on the electronic device.

9. The event detection method according to claim 8, wherein a record content of the plurality of workflows of an apparatus in the sub-area corresponding to each of the sub-area image information is transmitted to a server; wherein the indication device provides a light indication signal, a pointer indication signal, a digital mark indication signal, or a motion content indication signal.

10. The event detection method according to claim 9, wherein the event detection method is applicable to an event detection system, the event detection system includes a first image capturing device and a control circuit, and the control circuit is connected to the first image capturing device; wherein the first image capturing device is a camera and is disposed on one side of the first area, and the control circuit is connected to an editing interface; wherein a sequence of the plurality of workflows and a workflow content of each of the plurality of workflows are edited and adjusted through the editing interface; wherein a workflow number of the plurality of workflows associated with each of the indication signals is adjustable, and the workflow content of each of the plurality of workflows associated with each of the indication signals is adjustable; wherein a sequence and corresponding determination criteria of the plurality of workflows corresponding to the indication signals of each of a plurality of indication signal display modules of the indication device are adjustable; wherein the at least one software operation process, the at least one mouse operation process, the at least one keyboard operation process, or the at least one electronic device operation process of the control circuit simulates operation processes operated by a user on an electronic device.

11. The event detection method according to claim 10, wherein the action content of the human image information includes an entry action, a checking action, a repairing action, a leaving action, or a moving action; wherein the human image information is one or more image information of the user entering the plurality of sub-areas of the first area; wherein the control circuit determines an operation status of the apparatus according to the action content of the human image information and the indication signals of one of the plurality of indication signal display modules.

12. The event detection method according to claim 11, wherein the control circuit is further connected to a second image capturing device, and the second image capturing device is used to capture a plurality of second area image information of a second area; wherein the second image capturing device is a camera that is disposed on one side of the second area, and a sequence of the plurality of workflows and a workflow content of each of the plurality of workflows corresponding to the second area are edited and adjusted through the editing interface; wherein a workflow number of the plurality of workflows corresponding to the second area is adjustable, and the workflow content of each of the plurality of workflows is adjustable; wherein the plurality of workflows corresponding to the indication signals of each of the indication signal display modules of the indication device are adjustable; wherein, when editing through the editing interface, the editing interface is linked to the corresponding plurality of workflows according to indication image information of the indication signal, a color of the indication signal, or a shape of the indication signal; wherein the plurality of workflows are determined by recording the plurality of operation processes of the user on the electronic device, and simulating the plurality of operation processes of the user on the electronic device.

* * * * *